W. S. FOSTER.
BEAN SORTER.
APPLICATION FILED SEPT. 17, 1912.
1,079,913.
Patented Nov. 25, 1913.
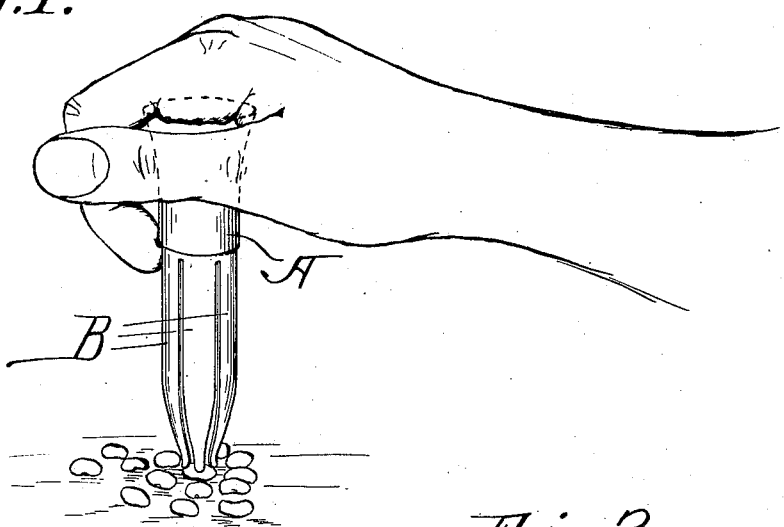
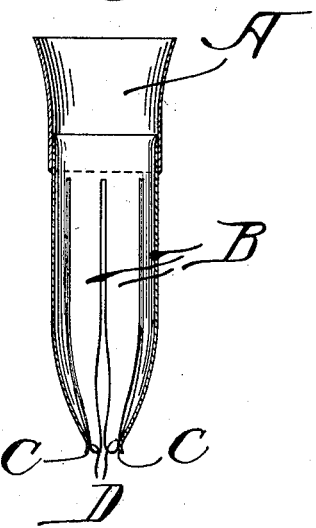
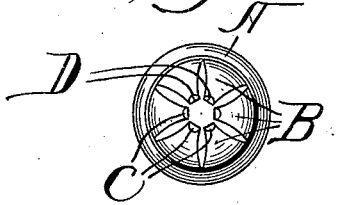
Witnesses:
Inventor:
William S. Foster,
by: Attorney.

UNITED STATES PATENT OFFICE.

WILLIAM S. FOSTER, OF DALLAS, WISCONSIN.

BEAN-SORTER.

1,079,913.  Specification of Letters Patent.  Patented Nov. 25, 1913.

Application filed September 17, 1912. Serial No. 720,775.

*To all whom it may concern:*

Be it known that I, WILLIAM S. FOSTER, a citizen of the United States, residing at Dallas, in the county of Barron and State of Wisconsin, have invented a new and useful Improvement in Bean-Sorters, of which the following is a specification.

The object of this invention is the production of a simple, inexpensive device for separating inferior or imperfect beans thus improving the quality and increasing the value of the remaining product for commercial and seeding purposes.

Heretofore it has been customary to either sort the beans by hand or by complicated and expensive apparatus. By my invention an extremely simple and inexpensive device is produced which can be held in the hand and will quickly and effectively separate beans without the use of any auxiliary mechanism. Further by the use of my improved picker the operator is able to pick out inferior beans with greater precision and speed than by hand picking.

In the accompanying drawing forming part of this specification, Figure 1 is a perspective of my invention shown held in the hand of the operator as when in use; Fig. 2 is a longitudinal section, and Fig. 3 is an end view.

A indicates a thin collar or band upon which is mounted a cluster of spring fingers B extending longitudinally therefrom and curved inwardly away from the collar to form a contracted neck of less normal diameter than the smallest diameter of bean which is sorted by the use of the device. The collar and fingers form a receptacle for the beans which are received through the neck. The fingers are made of resilient material permitting their outer ends which form the neck to spring apart and allow of a bean passing into the receptacle through the neck. The end of the collar opposite to the fingers forms a discharge opening for the beans in the sorter. The outer end of each finger is turned out to form a guide C and an inner shoulder D. The guides on the fingers are adapted to slide down over the bean and expand the fingers until the shoulders catch and retain the bean in the receptacle whereupon the fingers contract into normal position in readiness to be pressed into engagement with another bean.

In use the beans are preferably scattered in a single thick layer on a picking table so as to avoid removing good and bad together indiscriminately and so that the refuse or inferior beans may be at once seen and at once removed by the operators using sorters constructed in accordance with my invention. The body of the sorter is grasped and the hand of the operator held over the delivery end of the collar as shown in Fig. 1. The neck is then adjusted over the inferior beans one at a time and the sorter pressed down each time upon the table on which the beans to be sorted are spread. This downward movement causes the guide faces C to expand the outer ends of the fingers and admit the bean into the receptacle. After the receptacle has been filled with inferior beans through its neck the collected beans are ejected through the discharge end of the receptacle.

It is obvious to those skilled in the art to which this invention relates that this device may be used for sorting ordinary garden beans, peas and other commodities and where I use the term bean in the specification and following claim, I mean it to include coffee or other beans, and peas or other granular material and I do not confine myself to the use of this device for beans alone as it is manifest that it may be used for diverse materials.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claim.

Having described my invention, what I claim as new and desire to protect by Letters Patent is:—

In a device for picking beans and other articles, a tubular receptacle directly formed by a plurality of resilient fingers trending in the same general direction, sloping toward a common point at one end, until coinciding and forming an expansible entering mouth for a bean, said fingers being formed with inward detentures producing shoulders and outwardly curved extremities beyond said detentures producing flaring guides which are adapted to slide over the surface of a bean and expand said fingers until said detentures engage over said bean and hold the same within said fingers.

In testimony whereof, I have signed my name to this specification in the presence of two subscribing witnesses.

WILLIAM S. FOSTER.

Witnesses:
E. ENGLE,
D. A. RUSSELL.

Copies of this patent may be obtained for five cents each, by addressing the "Commissioner of Patents, Washington, D. C."